United States Patent
Dravnieks et al.

(10) Patent No.: US 9,274,820 B2
(45) Date of Patent: Mar. 1, 2016

(54) SPECIFYING USER DEFINED OR TRANSLATOR DEFINITIONS TO USE TO INTERPRET MNEMONICS IN A COMPUTER PROGRAM

(75) Inventors: John Robert Dravnieks, Kardinya (AU); John Robert Ehrman, Sunnyvale, CA (US); Dan Frederick Greiner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2443 days.

(21) Appl. No.: 11/614,935

(22) Filed: Dec. 21, 2006

(65) Prior Publication Data

US 2008/0155499 A1  Jun. 26, 2008

(51) Int. Cl.
  *G06F 9/45* (2006.01)
  *G06F 9/455* (2006.01)

(52) U.S. Cl.
  CPC .................. *G06F 9/45508* (2013.01)

(58) Field of Classification Search
  None
  See application file for complete search history.

(56) References Cited

U.S. PATENT DOCUMENTS

| | | | |
|---|---|---|---|
| 5,946,474 A | 8/1999 | Skogby | |
| 6,343,333 B1 | 1/2002 | Matsumoto et al. | |
| 6,487,713 B1 * | 11/2002 | Cohen et al. | 717/105 |
| 6,691,301 B2 * | 2/2004 | Bowen | 717/114 |
| 7,584,458 B2 * | 9/2009 | Das et al. | 717/126 |
| 2003/0061580 A1 | 3/2003 | Greaves | |
| 2006/0020919 A1 | 1/2006 | King | |
| 2006/0149643 A1 * | 7/2006 | Reiner et al. | 705/30 |
| 2008/0082958 A1 * | 4/2008 | Hartman et al. | 717/104 |

FOREIGN PATENT DOCUMENTS

| | | |
|---|---|---|
| JP | 62274432 | 11/1987 |
| JP | 63075837 | 4/1988 |
| JP | 63140339 | 6/1988 |
| JP | 03070037 | 3/1991 |

OTHER PUBLICATIONS

MSDN "Object-Oriented Programming in Visual Basic .NET", 2003, pp. 1-8 [online][retrieved on May 11, 2011]. Retrieved from <http://msdn.microsoft.com/en-us/library/aa289512(v=vs.71).aspx>.*

IBM, "Language Reference", High Level Assembler for MVS & VM & VSE, Release 5, Fifth Edition (Jun. 2004), Copyright International Business Machines Corporation 1982, 2004, Total 474 pp.

(Continued)

*Primary Examiner* — Evral Bodden
(74) *Attorney, Agent, or Firm* — David W. Victor; Konrad, Raynes, Davda & Victor LLP

(57) ABSTRACT

Provided are a method, system, and article of manufacture for specifying user defined or translator definitions to use to interpret mnemonics in a computer program. A mnemonic is processed in the computer program having a user defined definition and a translator definition. The mnemonic is interpreted according to the user defined definition in response to previously processing a mnemonic command specifying the mnemonic and the user defined definition. The mnemonic is interpreted according to the translator definition in response to previously processing a mnemonic command specifying the mnemonic and the translator definition.

31 Claims, 6 Drawing Sheets

(56) References Cited

OTHER PUBLICATIONS

IBM, "Principles of Operation", z/ Architecture, Fifth Edition (Sep. 2005), Copyright International Business Machines Corporation 1990-2005, Total 1069 pp.

U.S. Appl. No. 14/749,600, filed Jun. 24, 2015, entitled "Specifying User Defined or Translator Definitions to Use to Interpret Mnemonics in a Computer Program", invented by J. R. Dravnieks et al., Total 32 pp. [57.103C1 (Appln)].

* cited by examiner

| Mnemonic | Pointer to User Definition | Pointer to Translator Definition | Global Interpretation Flag | Local Interpretation Flag | Macro Interpretation Flag |

Mnemonic Table Entry

Shared Work Area

SPECIFYING USER DEFINED OR TRANSLATOR DEFINITIONS TO USE TO INTERPRET MNEMONICS IN A COMPUTER PROGRAM

BACKGROUND OF THE INVENTION

1. Field of the Invention

The present invention relates to a method, system, and article of manufacture for specifying user defined or translator definitions to use to interpret mnemonics in a computer program.

2. Description of the Related Art

Programmers write computer programs in computer languages referred to as the source code which includes data declarations and instructions that operate on data. The programmer writes keywords and commands in a language to instruct the language translator to perform certain actions. Such keywords and commands typically have meanings relevant to the context of their use, and may be abbreviated in a mnemonic form. A "mnemonic" as that term is used and defined herein may comprise a string of one or more characters, keyword, etc. having a defined meaning in a computer language. Before the program can be executed, the source code must be transformed to machine readable executable code.

Every programming language has a number of reserved names, language keywords, or mnemonics necessary for the language translator (a compiler, assembler, interpreter, etc.) to understand the structure and content of programs written in that language. The presence of reserved mnemonics may preclude the programmer from using such mnemonics in unexpected or ambiguous ways. If a programmer uses a mnemonic that matches a reserved mnemonic, also known as a built-in translator defined mnemonic, then the match may result in a misinterpretation of the meaning or structure of the program or an error message that may not indicate the actual cause of the problem.

Language keyword redefinition is especially problematic for assembler languages, where mnemonics can be used for referencing objects not defined in the program currently being assembled, and for instruction mnemonics. Most assemblers support a capability to allow the programmer to use mnemonics with the standard statement syntax to refer to both built-in or pre-defined mnemonics (such as assembler directives and machine instructions) and to user-defined mnemonics (such as macro-instructions). If the same statement syntax is used, the programmer may consequently write a statement in which such a mnemonic refers either to a built-in instruction known to the assembler or to a previously coded user-defined macro-instruction.

Prior art assembler implementations avoid possible conflicts between built-in and user defined mnemonic definitions by allowing only one definition of a given mnemonic to be used, to the exclusion of the other. That is, only one allowed form of any language keyword in the form of a mnemonic is supported, either as a built-in instruction or a macro-instruction, but not both.

As machine architectures and assembler facilities evolve, it is possible that the introduction of new built-in machine instruction mnemonics or assembler instruction mnemonics will conflict with existing user-defined macro-instruction mnemonics or the creation of new user-defined or vendor-supplied macro-instruction mnemonics will conflict with existing built-in mnemonics. In such cases, the programmer must either change the coding of his user-defined mnemonics to avoid using the unwanted new definition of the built-in machine instruction mnemonic, or must change the name of his user-defined macro-instruction to avoid conflicts when using the new built-in mnemonic.

For example, in the IBM® zSeries® z/Architecture® computers from International Business Machines Corporation, a new machine instruction with mnemonic MSG was introduced. The mnemonic MSG had been widely used in many programs for user-defined message-generating macro-instructions as a convenient abbreviation for "MESSAGE". The built-in machine instruction stands for MULTIPLY SINGLE (the G of MSG indicates the 64-bit version). Programs using such user-defined MSG macro-instructions that had the same name as the MULTIPLY SINGLE built-in instruction were faced with the problem of either avoiding the use of the new MSG machine instruction or of rewriting the MSG macro-instruction with a new name and then revising all programs that previously used the MSG mnemonic for the MSG macro-instruction to use the new name instead. For large volumes of code, such changes can impose an expensive updating burden, and require extensive retesting of many programs. (IBM, zSeries, and z/Architecture are registered trademarks of International Business Machines Corporation in the United States, other countries, or both).

To avoid this problem, programmers may devise complex programming techniques that tell the assembler to use one or the other definition of a mnemonic alternately. However, such advanced programming techniques may be error-prone and likely to confuse later readers or maintainers of the program who do not understand such techniques which may not be documented or widely known.

Thus, there is a need for techniques to provide flexibility to users of programming languages in specifying a user defined or translator defined definition for a mnemonic.

SUMMARY

Provided are a method, system, and article of manufacture for specifying user defined or translator definitions to use to interpret mnemonics in a computer program. A mnemonic is processed in the computer program having a user defined definition and a translator definition. The mnemonic is interpreted according to the user defined definition in response to previously processing a mnemonic command specifying the mnemonic and the user defined definition. The mnemonic is interpreted according to the translator definition in response to previously processing a mnemonic command specifying the mnemonic and the translator definition.

DETAILED DESCRIPTION

Figure 1:
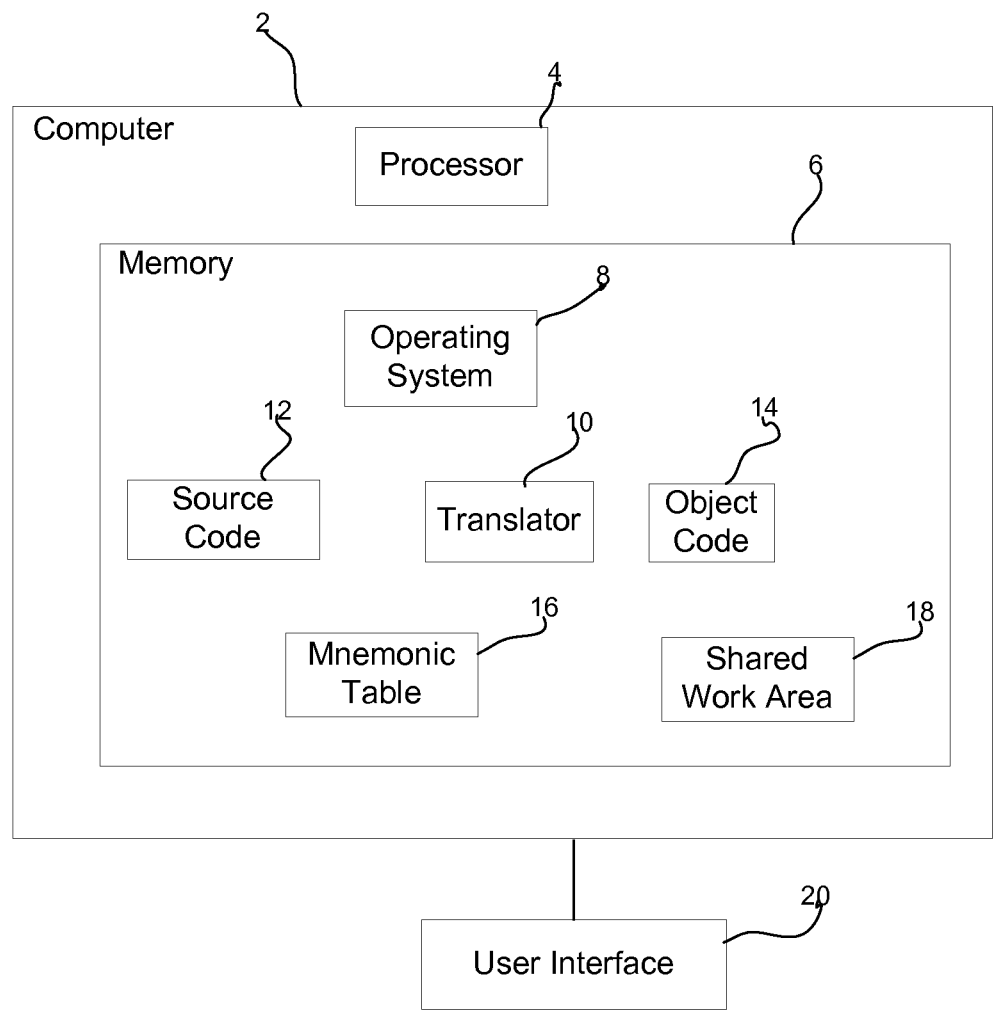
FIG. 1 illustrates an embodiment of a computing environment.

FIG. 1 illustrates an embodiment of a computing environment. A computer 2 includes a processor 4 and memory 6.

The processor 4 executes in the memory 6 an operating system 8 and a translator 10, which translates source code 12 in a computer language into executable object code 14. The computer language may comprise assembly language, C, C++, and other suitable computer languages known in the art. The translator 10 analyzes the source code 12 and may synthesize the source code 12 into an object module 14. The operating system 8 may include a binder program to process object modules to produce executable program objects and include a program fetch to load the executable text from the program object into the memory 6 for execution by the processor.

During initialization and when processing the source code 12, the translator 10 may update a mnemonic table 16 including information on mnemonics that are referenced in the source code 12. As mentioned a mnemonic comprises a keyword, instruction or string of one or more characters that performs an operation associated with that mnemonic. The translator 10 may have a translator definition for a mnemonic, such as a definition included within the translator 10 code. Additionally, there may be a user defined definition for the same mnemonic. Thus, mnemonics may be provided with both a translator definition and a user defined definition. The definitions specify the operations invoked when the mnemonic is processed. The translator 10 may further update a shared work area 18 having definitions of qualification characters used to modify a mnemonic to indicate whether the user defined or translator definition is used to interpret the mnemonic. A qualified mnemonic comprises a mnemonic that is modified with one or more qualification characters, where the qualification characters may comprise a prefix, suffix, quotation or other notation with respect to the mnemonic.

The user interface 20 may comprise an input device (e.g., keyboard, mouse, etc.) and output device (e.g., display monitor, etc.) to allow the user to control and observe translation operations.

Figures 2, 3:
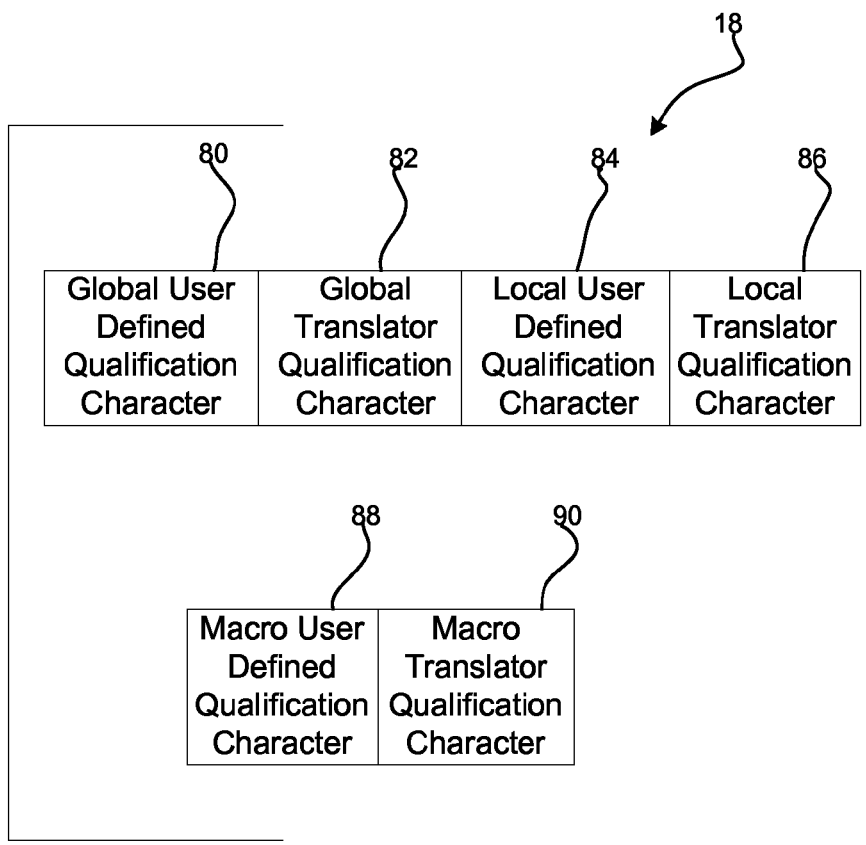
FIG. 2 illustrates an embodiment of a mnemonic table entry.
FIG. 3 illustrates an embodiment of information maintained in a shared work area.

FIG. 2 illustrates an embodiment of a mnemonic table entry 50 having information maintained in the mnemonic table 16 for a mnemonic, including:
mnemonic 52;
a pointer 54 to the user defined definition of the mnemonic 52;
a pointer 56 to the built-in translator definition of the mnemonic 52, which is part of the translator code;
a global interpretation flag 58 indicating the user defined 54 or translator 56 definition for a global scope;
a local interpretation flag 60 indicating the user defined 54 or translator 56 definition for a local scope; and
a macro interpretation flag 62 indicating the user defined 54 or translator 56 definition for use when interpreting the mnemonic in a macro expansion. The flags 58, 60, 62 may also indicate NULL, if no interpretation is indicated for a particular scope, global, local or macro.

FIG. 3 illustrates an embodiment of information included in the shared work area 18, including:
a global user defined qualification character 80 indicating the qualification character that specifies to interpret the mnemonic 52 with the user defined definition 54 notwithstanding any previously specified global, local or macro interpretations specified in the flags 58, 60, and 62;
a global translator qualification character 82 indicating the qualification character that specifies to interpret the mnemonic 52 with the translator definition 56 notwithstanding any previously specified global, local or macro interpretations specified in the flags 58, 60, and 62;
a local user defined qualification character 84 indicating the qualification character that specifies to interpret the mnemonic 52 with the user defined definition 54 notwithstanding any previously specified global, local or macro interpretations specified in the flags 58, 60, and 62 or previously specified global qualification character 80, 82;
a local translator qualification character 86 indicating the qualification character that specifies to interpret the mnemonic 52 with the translator definition 56 notwithstanding any previously specified global, local or macro interpretations specified in the flags 58, 60, and 62 or previously specified global qualification character 80, 82;
a macro user defined qualification character 88 indicating the qualification character that specifies to interpret the mnemonic 52 with the user defined definition 54 within a macro expansion notwithstanding any previously specified global, local or macro interpretations specified in the flags 58, 60, and 62 or previously specified global 80, 82 and/or local 84, 86 qualification characters; and
a macro translator qualification character 90 indicating the qualification character that specifies to interpret the mnemonic 52 with the translator definition 56 within a macro notwithstanding any previously specified global, local or macro interpretations specified in the flags 58, 60, and 62 or previously specified global 80, 82 and/or local 84, 86 qualification characters.

The term "qualification character" may refer to one or more alpha-numeric or special characters that are combined with a mnemonic to specify the interpretation (user defined or translator) for the mnemonic. Further, the qualification character definitions 80-90 may also indicate NULL, if no qualification character is provided for a particular definition and scope.

In further embodiments, there may be separate global, local and macro qualification characters 80-90 prefix, suffix, or quotation qualification characters.

A mnemonic command controls the interpretation of the mnemonic and how the mnemonic is defined and used. A global mnemonic command may be specified externally when the translator 10 is first invoked, by some default convention or at the start of the program 12 to be translated. The global mnemonic command specification may apply throughout the program 12 in the absence of any subsequent local or macro mnemonic controls providing statement-specific or definition-specific controls. Global mnemonic control commands may designate individual mnemonics to be interpreted with the user defined 54 or translator 56 definitions. Global qualifier commands associate a qualification character that when combined with the mnemonic specifies a user defined or translator definition for the modified mnemonic.

Global control of the interpretation of individual mnemonics is specified by providing the translator 10 with the name or names of mnemonics to be interpreted in a designated way. For example, the global command (1) may specify that the mnemonic1, mnemonic 2 ... will be interpreted globally with the user definition 54, where "UDMNEMNONIC" is an abbreviation for user-defined mnemonic, and global command (2) specifies that the mnemonic3, mnemonic4 ... will be interpreted globally with the translator definition 56, where "BIMNEMONIC" is an abbreviation for built-in mnemonic.

$$\text{UDMNEMONIC}=(\text{mnemonic1},\text{mnemonic2},\dots) \qquad (1)$$

$$\text{BIMNEMONIC}=(\text{mnemonic3},\text{mnemonic4},\dots) \qquad (2)$$

Global declaration of the notation used to control the interpretation of mnemonics in individual statements is specified by providing the translator 10 with information allowing qualified mnemonics to be interpreted in a specific way. For instance, the qualifier command (3) below specifies qualification characters, e.g., "< >", that when providing quotes for the mnemonic "XYZ", e.g., "<XYZ>", indicates that the user defined definition 54 is to be used; the qualifier command (4) below specifies qualification characters that when prefixed to the mnemonic, e.g., "U.XYZ", indicates that the user defined definition is to be used; qualifier command (5) below specifies qualification characters that when appended to the mnemonic, e.g., "XYZ.U", indicates that the user defined definition is to be used; the qualifier command (6) specifies qualification characters, e.g., "[ ]", that when providing quotes for the mnemonic, e.g., "[XYZ]" indicate that the translator definition 56 is to be used; qualifier command (7) specifies qualification characters that when prefixed to the mnemonic, e.g., "B.XYZ", indicate that the translator definition is to be used; and qualifier command (8) specifies qualification characters that when appended to the mnemonic, e.g., "XYZ.B", indicate that the translator definition is to be used.

UDMQC='<','>'  (3)

UDPREFIX='U.'  (4)

UDSUFFIX='.U'  (5)

BIMQC='[',']'  (6)

BIPREFIX='B.'  (7)

BISUFFIX='.B'  (8)

A local mnemonic command specifying the interpretation of a mnemonic to have local scope, i.e., to override the global or previous local interpretation, may be designated by use of a local statement, such as ACONTROL, with the mnemonic command, e.g., UDMNEMONIC, BIMNEMONIC. Use of the local statement, e.g., ACONTROL, ensures that the local interpretation flag 60 is updated with the interpretation to use for the specified mnemonic. For example, the local mnemonic command (9) may specify that the mnemonic1, mnemonic 2 . . . will be interpreted locally with the user definition 54 and the local mnemonic command (10) specifies that the mnemonic3, mnemonic4 . . . will be interpreted locally with the translator definition 56.

ACONTROL UDMNEMONIC=(mnemonic1,mnemonic2 . . . )  (9)

ACONTROL BIMNEMONIC=(mnemonic3,mnemonic4, . . . )  (10)

A local qualifier command specifying the interpretation of a qualifying character to have local scope may also be designated by use of the local statement, such as ACONTROL, with the qualifier command, as shown below. Use of the local statement, ACONTROL, with the qualifier command, as shown below in commands (11) through (16), ensures that the local qualification character 84, 86 is updated.

ACONTROL UDMQC='<','>'  (11)

ACONTROL UDPREFIX='U.'  (12)

ACONTROL UDSUFFIX='.U'  (13)

ACONTROL BIMQC='[',']'  (14)

ACONTROL BIPREFIX='B.'  (15)

ACONTROL BISUFFIX='.B'  (16)

A reversion command may be used to reset the local qualification characters 84, 86 to use the default characters, which may be the global qualification characters 80 and 82, specified at the time the translator 10 is invoked. For example, the reversion commands (17) through (22) may be used to reset the local qualification characters used as a prefix, suffix, and quotes to the default global qualification characters.

ACONTROL BIMQC=DEFAULT  (17)

ACONTROL BIPREFIX=DEFAULT  (18)

ACONTROL BISUFFIX=DEFAULT  (19)

ACONTROL UDMQC=DEFAULT  (20)

ACONTROL UDPREFIX=DEFAULT  (21)

ACONTROL UDSUFFIX=DEFAULT  (22)

A remove command may be used to remove the local qualification characters by setting the local qualification characters to NULL. For example, the remove command (23) provides an example of how particular qualification characters may be set to NULL.

ACONTROL UDSUFFIX=NULL  (23)

In one embodiment, if the local mnemonic command or local qualifier command is included in a macro, then any mnemonics called within the macro and following the expansion of the macro may be interpreted using the interpretation specified by the local mnemonic command or local qualifier command included in the expanded macro. If multiple local mnemonic or qualifier commands are included in the macro, then the most recently processed command would provide the local interpretation for the mnemonic.

Described embodiments provide statements for a programmer to use to ensure that a local mnemonic command or local qualifier command invoked in a macro provide interpretations for mnemonics and qualification characters that are only applicable within macro expansions, and not to mnemonics called outside the macro following the macro expansion.

Figure 4:
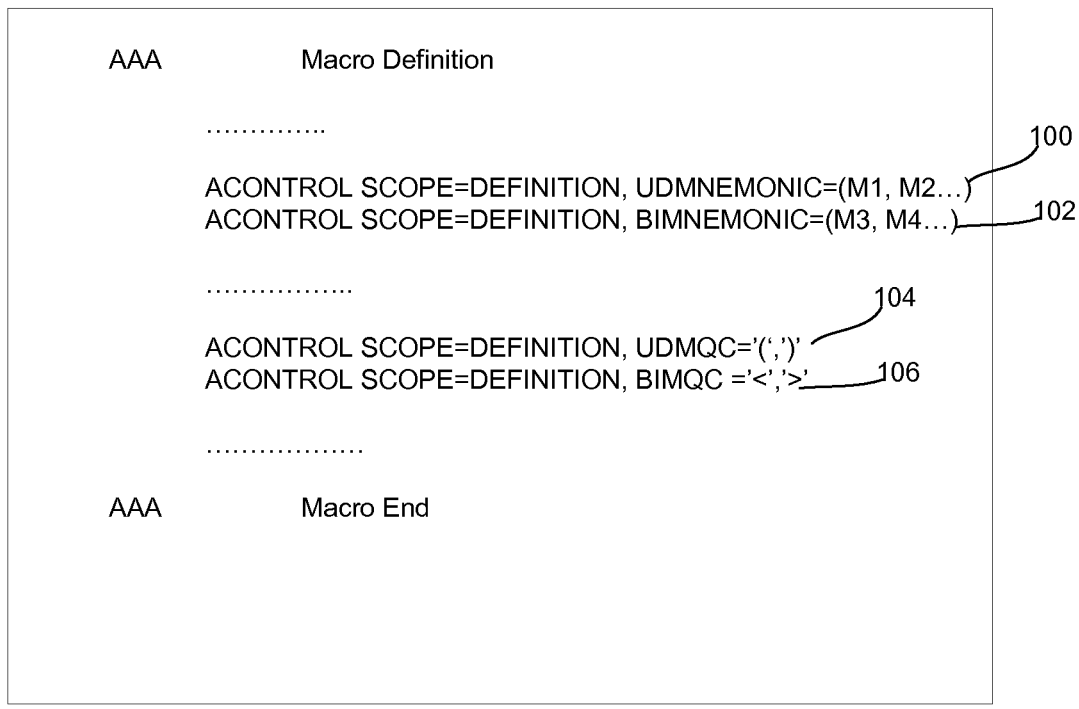
FIG. 4 illustrates an example of a macro definition.

FIG. 4 illustrates an example of pseudo-code for a macro definition "AAA" that includes local mnemonic commands 100, 102 having a SCOPE=DEFINITION operand that indicates that the interpretation provided for the mnemonics (m1, m2, m3, m4 . . . ) is to apply only within the macro, i.e., of macro scope. These local mnemonic commands 100, 102 may set the macro interpretation flag 62 for the listed mnemonics. The local qualifier commands 104, 106 having the SCOPE=DEFINITION operand specify that the qualification characters have only macro scope, i.e., only apply within a macro expansion, not external to the macro. These local qualifier commands 104, 106 set the macro qualification characters 88 and 90 (FIG. 3). Local qualifier commands having macro scope may also be provided in the macro for suffix and prefix characters. The use of the macro scope (e.g., SCOPE=DEFINITION) ensures that the interpretations specified for qualification characters and mnemonic interpretations only apply within a macro expansion and not to calls to the mnemonic in the source code 12 external to a macro.

Figure 5:
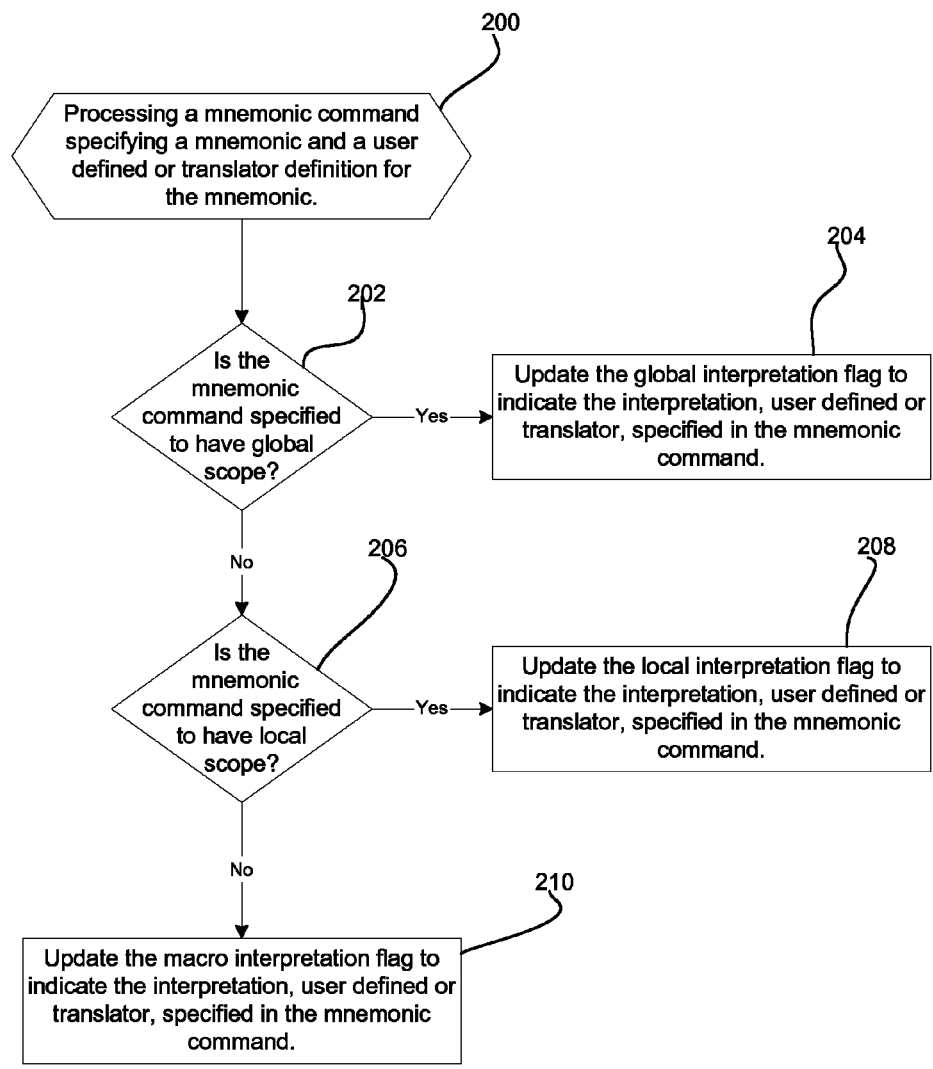
FIG. 5 illustrates an embodiment to process a mnemonic command specifying a user defined or translator defined definition for a mnemonic.

FIG. 5 illustrates an embodiment of operations performed by the translator 10 to process a mnemonic command providing an interpretation for a particular mnemonic. Control begins with the translator 10 processing (at block 200) a mnemonic command specifying a mnemonic and a user defined or translator definition for the mnemonic. As discussed, the mnemonic command may be processed when the translator 10 is invoked or within the source code 12. If (at block 202) the mnemonic command is specified to have global scope, e.g., is specified when the translator 10 is invoked or at the beginning of the source code 12 without a local statement (e.g., ACONTROL), then the translator 10 updates (at block 204) the global interpretation flag 58 to indicate the interpretation, e.g., user defined or translator, specified in the processed mnemonic command. If (at block 206) the mnemonic command specifies a local scope, e.g., is called with a local statement such as ACONTROL, then the translator 10 updates (at block 208) the local interpretation flag 60 to indicate the interpretation, user defined or translator, specified in the processed mnemonic command. Otherwise, if a macro scope is specified with the mnemonic command, such as the mnemonic command is processed in a macro with a macro scope specified, e.g., "SCOPE=DEFINITION", then the translator 10 updates (at block 210) the macro interpretation flag 62 to indicate the interpretation, user defined or translator, specified in the processed mnemonic command.

With the operations of FIG. 5, the local 60 and macro 62 interpretations specified for a mnemonic 52 comprise the interpretation setting provided in the last processed mnemonic command having the local or macro scope. Two local mnemonic commands, one before and one after the reference to the mnemonic in the source code 12, can provide a statement specific scope for the mnemonic that only applies to the one or more statements between the two local mnemonic commands. Further, with the described embodiments, more than one macro-scope control statement may be issued to change the interpretation of mnemonics within that macro scope and a local-scope command may be issued within a macro scope that takes effect when the macro scope is ended.

Figure 6:
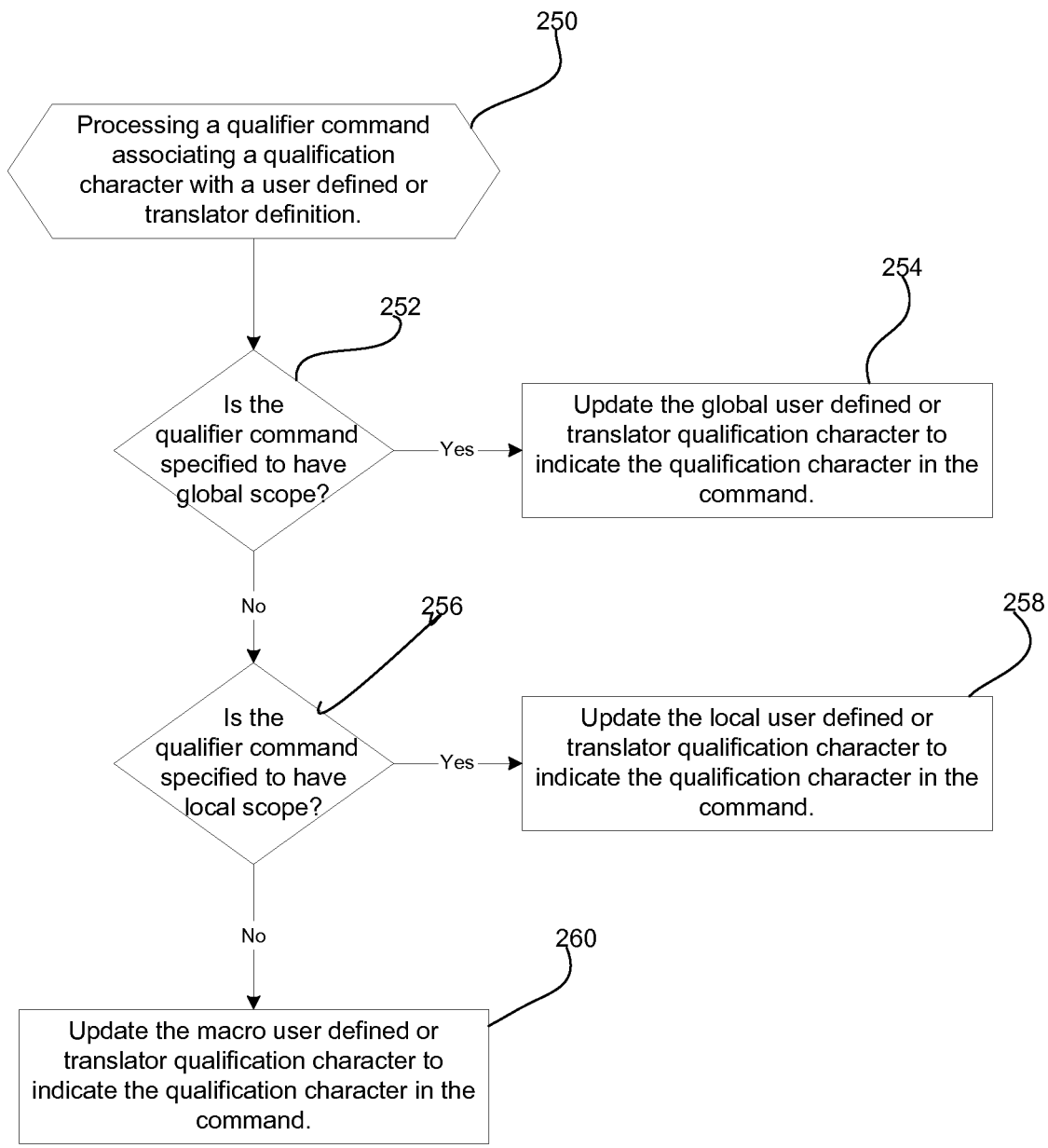
FIG. 6 illustrates an embodiment of a qualifier command associating a user defined or translator defined definition with a qualification character.

FIG. 6 illustrates an embodiment of operations performed by the translator 10 to process a global, local or macro qualifier command associating a qualification character with the user defined or translator definition for a mnemonic. Control begins with the translator 10 processing (at block 250) a qualifier command associating a qualification character with a user defined or translator definition for the mnemonic. As discussed, the qualifier command may be processed when the translator 10 is invoked or within the source code 12. If (at block 252) the qualifier command is specified to have global scope, e.g., is specified when the translator 10 is invoked or at the beginning of the source code 12 without a local statement (e.g., ACONTROL), then the translator 10 updates (at block 254) the global user defined 80 or translator 82 qualification character (depending on whether the qualifier command specified the user defined or translator definition) to indicate the qualification character specified in the command. If (at block 256) the qualifier command specifies a local scope, e.g., is called with a local statement such as ACONTROL, then the translator 10 updates (at block 258) the local user defined 84 or translator 86 qualification character (depending on whether the qualifier command specified the user defined or translator definition) to indicate the qualification character specified in the command. Otherwise, if a macro scope is specified with the qualifier command, such as the qualifier command is processed in a macro with a macro scope specified, e.g., "SCOPE=DEFINITION", then the translator 10 updates (at block 260) the macro user defined 88 or translator 90 qualification character (depending on whether the qualifier command specified the user defined or translator definition) to indicate the qualification character specified in the command. As discussed, there may be separate user defined and translator qualifier characters for suffixes, prefixes and quotes (i.e., characters that enclose the mnemonic).

With the operations of FIG. 6, the local 84, 86 and macro 88, 90 interpretations specified for the qualification character comprise the interpretation setting provided in the last processed qualifier command having the local or macro scope. Two local qualifier commands, one before and one after the call to the qualifier mnemonic in the source code 12, can provide a statement specific qualification character that only applies to the one or more statements between the two local qualifier commands.

Figure 7:
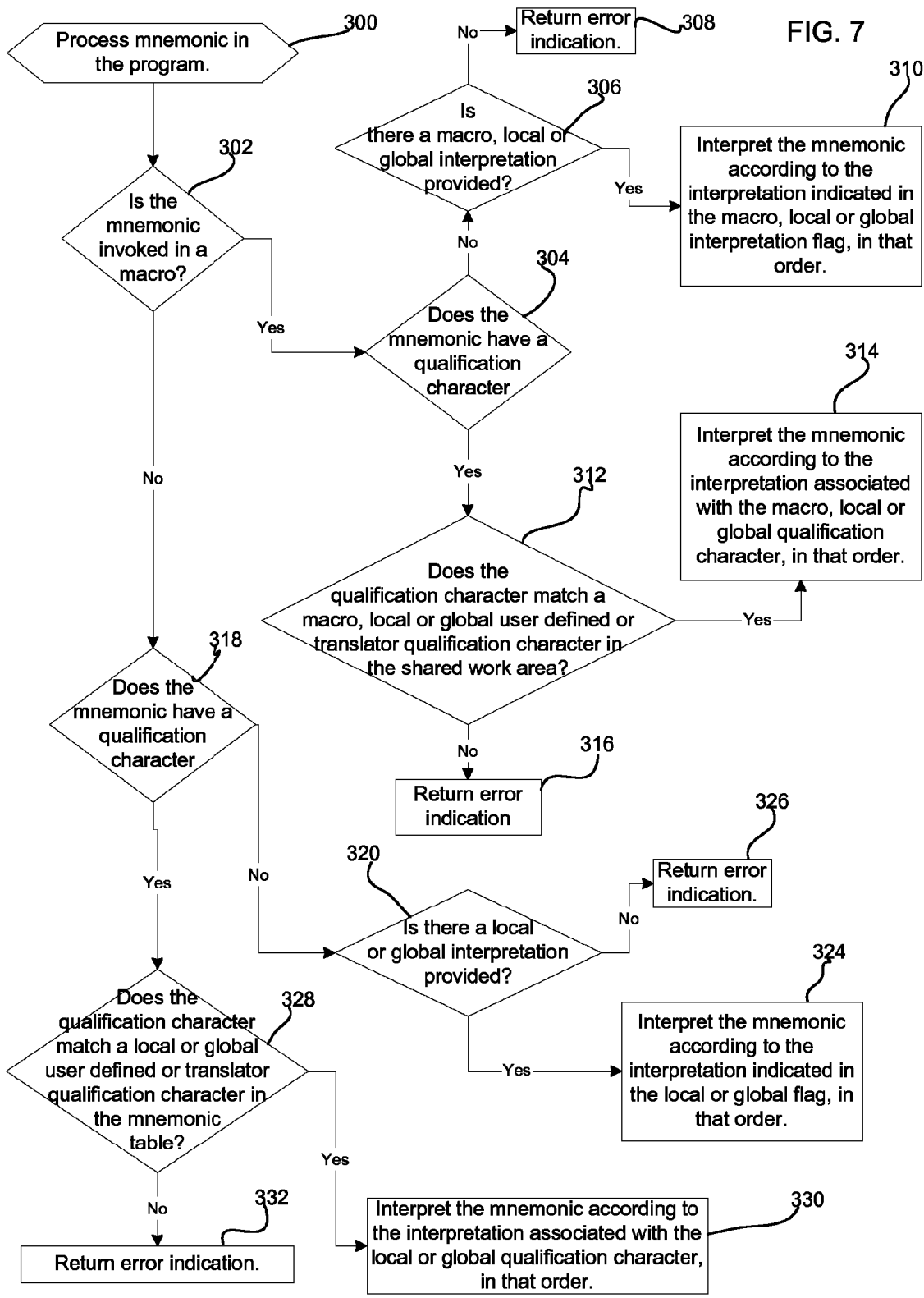
FIG. 7 illustrates an embodiment of operations to interpret a mnemonic.

FIG. 7 illustrates an embodiment of operations performed by the translator 10 when processing a mnemonic in the source code 12. Upon processing (at block 300) a mnemonic, if (at block 302) the mnemonic is invoked during a macro expansion and if (at block 304) the mnemonic does not have a qualification character, e.g., suffix, prefix, quotes, then the translator 10 determines (at block 306) whether there is a macro 62, local 60 or global interpretation 58 provided for that mnemonic. If there is no interpretation provided, i.e., all flags 58, 60, and 62 are NULL, then the translator returns (at block 308) an error indication. If one interpretation flag defines an interpretation for the mnemonic (user defined 54 or translator 56), then the translator 10 interprets (at block 310) the mnemonic according to the interpretation defined in the macro 62, local 60 or global 58 interpretation flag, in that order. In this way, the interpretation is first provided by the macro interpretation flag 62, if applicable and available, then to the local interpretation flag 60, if available, and then to the global flag 58.

If (at block 304) the mnemonic does have a qualification character, e.g., suffix, prefix, quotes, then the translator 10 determines (at block 312) whether the qualification character matches a macro 88, 90, local 84, 86 or global 82, 80 user defined or translator qualification character in the shared work area 18. If so, then the translator 10 interprets (at block 314) the mnemonic according to the interpretation associated first with the macro qualification character 88, 90, if provided, then the local qualification character 84, 86, if provided, and then the global qualification character 80, 82, in that order. If the qualification character used with the mnemonic is not defined in the shared work area 18, then the translator 10 provides an error condition (at block 316).

If (at block 302) the mnemonic is not invoked within a macro expansion and if (at block 318) the mnemonic does not have a qualification character, then the translator 10 determines (at block 320) whether there is a local 60 or global 58 interpretation provided for that mnemonic, in that order. If so, then the translator 10 interprets (at block 324) the mnemonic according to the interpretation indicated in the local 60 or global 58 flag, using the local interpretation 60, if provided, or the global interpretation 58 if no local interpretation 60 is provided. If no local 60 or global 58 interpretation is provided, then an error indication is returned (at block 326). If (at block 318) the mnemonic has a qualification character, i.e., is a qualified mnemonic, then the translator 10 determines (at block 328) whether the qualification character matches a local 84, 86 or global 80, 82 qualification character (user defined or translator). If so, then the translator 10 interprets (at block 330) the qualified mnemonic according to the interpretation associated with the local or global qualification character, in that order so that the local defined qualification character 84, 86 has precedence over the global defined qualification character 80, 82. Otherwise, if there is no match, then an error indication is returned (at block 332).

The described embodiments provide programming statements to enable a programmer to set and then change in the source code the mnemonic interpretation as user defined or translator and the association of the qualification characters with user defined or translator definitions. The programmer may further specify the scope of interpretation as global, local, and macro, and use statements to provide for statement specific definitions.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission medium, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for translating statements in a computer program stored in a computer readable storage device, comprising:
   processing a mnemonic in the computer program in the computer readable storage device having a user defined definition and a translator definition, wherein the definitions specify operations invoked when the mnemonic is processed;
   processing a first mnemonic command specifying the mnemonic and the user defined definition;
   interpreting the mnemonic in the first mnemonic command according to the user defined definition in response to a first interpretation setting provided when the first mnemonic command was last processed specifying the mnemonic and the user defined definition;

processing a second mnemonic command specifying the mnemonic and the translator definition after interpreting the mnemonic according to the user defined definition;

interpreting the mnemonic in the second mnemonic command according to the translator definition in response to a second interpretation setting provided when the second mnemonic command was last processed specifying the mnemonic and the translator definition;

updating a global flag in a mnemonic table for the mnemonic indicating to interpret the mnemonic with the user defined or translator definition specified in a global mnemonic command having global scope in response to processing the global mnemonic command; and updating a local flag in the mnemonic table for the mnemonic indicating to interpret the mnemonic with the user defined or translator definition specified in a local mnemonic command having local scope in response to processing the local mnemonic command, wherein the local interpretation overrides the global interpretation indicated by the global flag.

2. The method of claim 1, further comprising:

processing a qualified mnemonic in the computer program comprising the mnemonic and a qualification character;

interpreting the qualified mnemonic according to the user defined definition for the mnemonic in response to a last processed qualifier command comprising a first qualifier command associating the qualification character with the user defined definition; and interpreting the qualified mnemonic according to the translator definition for the mnemonic in response to the last processed qualifier command comprising a second qualifier command associating the qualification character with the translator definition.

3. The method of claim 2, wherein the first and second qualifier commands indicate that the qualification character is either applied as a prefix, suffix or quotation to the mnemonic being qualified.

4. The method of claim 1, further comprising:

updating a macro flag in the mnemonic table for the mnemonic indicating to interpret the mnemonic with the user defined or translator definition specified in a local mnemonic command having a macro scope in response to processing the local mnemonic command having the macro scope within a macro, wherein the local interpretation having the macro scope overrides the global or local interpretation indicated in the global flag or the local flag during processing within the macro, and wherein the global or local interpretation indicated by the global flag and the local flag override the interpretation identified in the macro flag for processing external to the macro.

5. The method of claim 1, wherein the first and second mnemonic commands have a global scope to apply to all instances of the mnemonic in the computer program, with an exception for subsequent mnemonic commands for the mnemonic that override the mnemonic command for the mnemonic having the global scope.

6. The method of claim 5, further comprising:

interpreting the mnemonic according to the user defined definition in response to previously processing a local mnemonic command specifying the mnemonic and the user defined definition, wherein the local mnemonic command specifying the user defined definition overrides any previous mnemonic command of global scope specifying the mnemonic and the translator definition; and interpreting the mnemonic according to the translator definition in response to previously processing a local mnemonic command specifying the mnemonic and the translator definition, wherein the local mnemonic command specifying the translator definition overrides any previous mnemonic command of global scope specifying the mnemonic and the user defined definition.

7. The method of claim 6, wherein the mnemonic is interpreted and the local mnemonic command is processed within a macro defining a mnemonic and wherein the scope of the processed local mnemonic command applies to instances of the mnemonic within the macro.

8. The method of claim 7, wherein the mnemonic defined by the macro is a same or different mnemonic from the mnemonic specified in the local mnemonic command.

9. The method of claim 5, further comprising:

processing a qualified mnemonic in the computer program comprising the mnemonic and a qualification character;

interpreting the qualified mnemonic according to the user defined definition for the mnemonic in response to previously processing a local qualifier command associating the qualification character with the user defined definition, wherein a use of the qualification character with the mnemonic local qualifier command specifying the user defined definition overrides any mnemonic command specifying the mnemonic and the translator definition which precedes the local qualifier command specifying the user defined definition; and interpreting the qualified mnemonic according to the translator definition for the mnemonic in response to previously processing a local qualifier command associating the qualification character with the translator definition, wherein a use of the qualification character with the mnemonic local qualifier command specifying the user translator definition overrides any mnemonic command specifying the mnemonic and the user defined definition which precedes the local qualifier command specifying the translator definition.

10. The method of claim 9, wherein the local qualifier command and the local mnemonic command are defined within a macro in the computer program.

11. The method of claim 10, further comprising:

interpreting the local qualifier command or the local mnemonic command called within the macro to apply only to instances of the mnemonic called within the macro in response to the local qualifier command or the local mnemonic command being specified to have a macro scope and to not affect the interpretation of the mnemonic provided by any local qualifier command or local mnemonic command external to the macro.

12. A system for translating statements in a computer program, comprising:

a processor;

a computer readable storage device including a translator executed by the processor to perform operations, the operations comprising:

processing a mnemonic in the computer program having a user defined definition and a translator definition;

processing a first mnemonic command specifying the mnemonic and the user defined definition;

interpreting the mnemonic in the first mnemonic command according to the user defined definition in response to a first interpretation setting provided when the first mnemonic command was last processed specifying the mnemonic and the user defined definition;

processing a second mnemonic command specifying the mnemonic and the translator definition after interpreting the mnemonic according to the user defined definition;

interpreting the mnemonic in the second mnemonic command according to the translator definition in response to a second interpretation setting provided when the second mnemonic command was last processed specifying the mnemonic and the translator definition;

updating a global flag in a mnemonic table for the mnemonic indicating to interpret the mnemonic with the user defined or translator definition specified in a global mnemonic command having global scope in response to processing the global mnemonic command; and updating a local flag in the mnemonic table for the mnemonic indicating to interpret the mnemonic with the user defined or translator definition specified in a local mnemonic command having local scope in response to processing the local mnemonic command, wherein the local interpretation overrides the global interpretation indicated by the global flag.

13. The system of claim 12, wherein the operations caused by the translator further comprise:

processing a qualified mnemonic in the computer program comprising the mnemonic and a qualification character;

interpreting the qualified mnemonic according to the user defined definition for the mnemonic in response to a last processed qualifier command comprising a first qualifier command associating the qualification character with the user defined definition; and interpreting the qualified mnemonic according to the translator definition for the mnemonic in response to the last processed qualifier command comprising a second qualifier command associating the qualification character with the translator definition.

14. The system of claim 12, wherein the operations caused by the translator further comprise:

updating a macro flag in the mnemonic table for the mnemonic indicating to interpret the mnemonic with the user defined or translator definition specified in a local mnemonic command having a macro scope in response to processing the local mnemonic command having the macro scope within a macro, wherein the local interpretation having the macro scope overrides the global or local interpretation indicated in the global flag or the local flag during processing within the macro, and wherein the global or local interpretation indicated by the global flag and the local flag override the interpretation identified in the macro flag for processing external to the macro.

15. The system of claim 12, wherein the first and second mnemonic commands have a global scope to apply to all instances of the mnemonic in the computer program, with an exception for subsequent mnemonic commands for the mnemonic that override the mnemonic command for the mnemonic having the global scope.

16. The system of claim 15, wherein the operations caused by the translator further comprise:

interpreting the mnemonic according to the user defined definition in response to previously processing a local mnemonic command specifying the mnemonic and the user defined definition, wherein the local mnemonic command specifying the user defined definition overrides any previous mnemonic command of global scope specifying the mnemonic and the translator definition; and interpreting the mnemonic according to the translator definition in response to previously processing a local mnemonic command specifying the mnemonic and the translator definition, wherein the local mnemonic command specifying the translator definition overrides any previous mnemonic command of global scope specifying the mnemonic and the user defined definition.

17. The system of claim 16, wherein the mnemonic is interpreted and the local mnemonic command is processed within a macro defining a mnemonic and wherein the scope of the processed local mnemonic command applies to instances of the mnemonic within the macro.

18. The system of claim 15, wherein the operations caused by the translator further comprise:

processing a qualified mnemonic in the computer program comprising the mnemonic and a qualification character;

interpreting the qualified mnemonic according to the user defined definition for the mnemonic in response to previously processing a local qualifier command associating the qualification character with the user defined definition, wherein a use of the qualification character with the mnemonic local qualifier command specifying the user defined definition overrides any mnemonic command specifying the mnemonic and the translator definition which precedes the local qualifier command specifying the user defined definition; and interpreting the qualified mnemonic according to the translator definition for the mnemonic in response to previously processing a local qualifier command associating the qualification character with the translator definition, wherein a use of the qualification character with the mnemonic local qualifier command specifying the user translator definition overrides any mnemonic command specifying the mnemonic and the user defined definition which precedes the local qualifier command specifying the translator definition.

19. The system of claim 18, wherein the local qualifier command and the local mnemonic command are defined within a macro in the computer program.

20. The system of claim 19, wherein the operations caused by the translator further comprise:

interpreting the local qualifier command or the local mnemonic command called within the macro to apply only to instances of the mnemonic called within the macro in response to the local qualifier command or the local mnemonic command being specified to have a macro scope and to not affect the interpretation of the mnemonic provided by any local qualifier command or local mnemonic command external to the macro.

21. An article of manufacture comprising a non-transitory computer readable storage device including code executed to translate statements in a computer program, wherein the code is executed to perform operations, the operations comprising:

processing a mnemonic in the computer program having a user defined definition and a translator definition;

processing a first mnemonic command specifying the mnemonic and the user defined definition;

interpreting the mnemonic in the first mnemonic command according to the user defined definition in response to a first interpretation setting provided when the first mnemonic command was last processed specifying the mnemonic and the user defined definition;

processing a second mnemonic command specifying the mnemonic and the translator definition after interpreting the mnemonic according to the user defined definition;

interpreting the mnemonic in the second mnemonic command according to the translator definition in response to a second interpretation setting provided when the second mnemonic command was last processed specifying the mnemonic and the translator definition;

updating a global flag in a mnemonic table for the mnemonic indicating to interpret the mnemonic with the user defined or translator definition specified in a global mnemonic command having global scope in response to processing the global mnemonic command; and updating a local flag in the mnemonic table for the mnemonic indicating to interpret the mnemonic with the user defined or translator definition specified in a local mnemonic command having local scope in response to processing the local mnemonic command, wherein the local interpretation overrides the global interpretation indicated by the global flag.

22. The article of manufacture of claim 21, wherein the operations further comprise:

processing a qualified mnemonic in the computer program comprising the mnemonic and a qualification character;

interpreting the qualified mnemonic according to the user defined definition for the mnemonic in response to a last processed qualifier command comprising a first qualifier command associating the qualification character with the user defined definition; and interpreting the qualified mnemonic according to the translator definition for the mnemonic in response to the last processed qualifier command comprising a second qualifier command associating the qualification character with the translator definition.

23. The article of manufacture of claim 22, wherein the first and second qualifier commands indicate that the qualification character is either applied as a prefix, suffix or quotation to the mnemonic being qualified.

24. The article of manufacture of claim 21, wherein the operations further comprise:

updating a macro flag in the mnemonic table for the mnemonic indicating to interpret the mnemonic with the user defined or translator definition specified in a local mnemonic command having a macro scope in response to processing the local mnemonic command having the macro scope within a macro, wherein the local interpretation having the macro scope overrides the global or local interpretation indicated in the global flag or the local flag during processing within the macro, and wherein the global or local interpretation indicated by the global flag and the local flag override the interpretation identified in the macro flag for processing external to the macro.

25. The article of manufacture of claim 21, wherein the first and second mnemonic commands have a global scope to apply to all instances of the mnemonic in the computer program, with an exception for subsequent mnemonic commands for the mnemonic that override the mnemonic command for the mnemonic having the global scope.

26. The article of manufacture of claim 25, wherein the operations further comprise:

interpreting the mnemonic according to the user defined definition in response to previously processing a local mnemonic command specifying the mnemonic and the user defined definition, wherein the local mnemonic command specifying the user defined definition overrides any previous mnemonic command of global scope specifying the mnemonic and the translator definition; and interpreting the mnemonic according to the translator definition in response to previously processing a local mnemonic command specifying the mnemonic and the translator definition, wherein the local mnemonic command specifying the translator definition overrides any previous mnemonic command of global scope specifying the mnemonic and the user defined definition.

27. The article of manufacture of claim 26, wherein the mnemonic is interpreted and the local mnemonic command is processed within a macro defining a mnemonic and wherein the scope of the processed local mnemonic command applies to instances of the mnemonic within the macro.

28. The article of manufacture of claim 27, wherein the mnemonic defined by the macro is a same or different mnemonic from the mnemonic specified in the local mnemonic command.

29. The article of manufacture of claim 25, wherein the operations further comprise:

processing a qualified mnemonic in the computer program comprising the mnemonic and a qualification character;

interpreting the qualified mnemonic according to the user defined definition for the mnemonic in response to previously processing a local qualifier command associating the qualification character with the user defined definition, wherein a use of the qualification character with the mnemonic local qualifier command specifying the user defined definition overrides any mnemonic command specifying the mnemonic and the translator definition which precedes the local qualifier command specifying the user defined definition; and interpreting the qualified mnemonic according to the translator definition for the mnemonic in response to previously processing a local qualifier command associating the qualification character with the translator definition, wherein a use of the qualification character with the mnemonic local qualifier command specifying the user translator definition overrides any mnemonic command specifying the mnemonic and the user defined definition which precedes the local qualifier command specifying the translator definition.

30. The article of manufacture of claim 29, wherein the local qualifier command and the local mnemonic command are defined within a macro in the computer program.

31. The article of manufacture of claim 30, wherein the operations further comprise:

interpreting the local qualifier command or the local mnemonic command called within the macro to apply only to instances of the mnemonic called within the macro in response to the local qualifier command or the local mnemonic command being specified to have a macro scope and to not affect the interpretation of the mnemonic provided by any local qualifier command or local mnemonic command external to the macro.

* * * * *